United States Patent Office 2,818,275
Patented Dec. 31, 1957

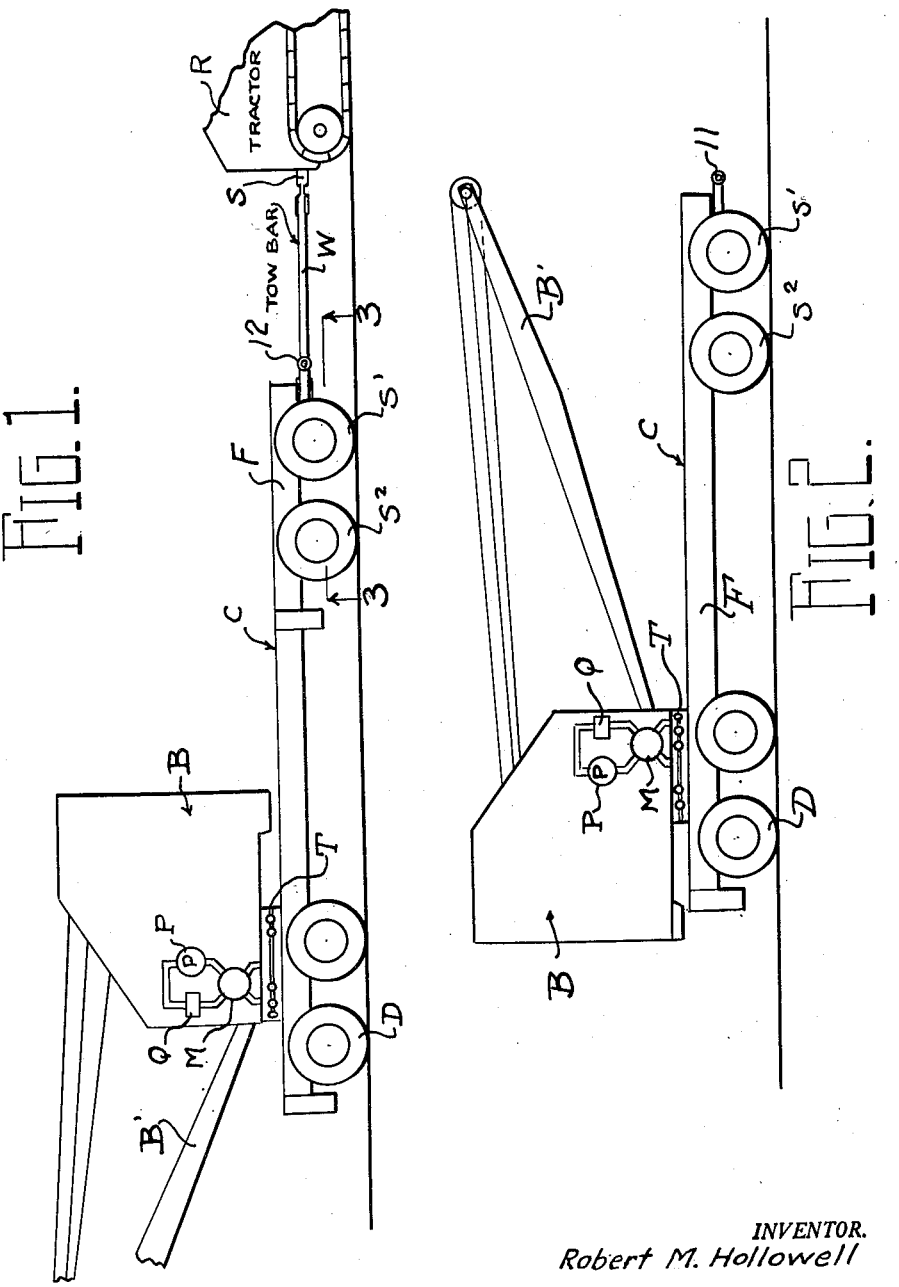

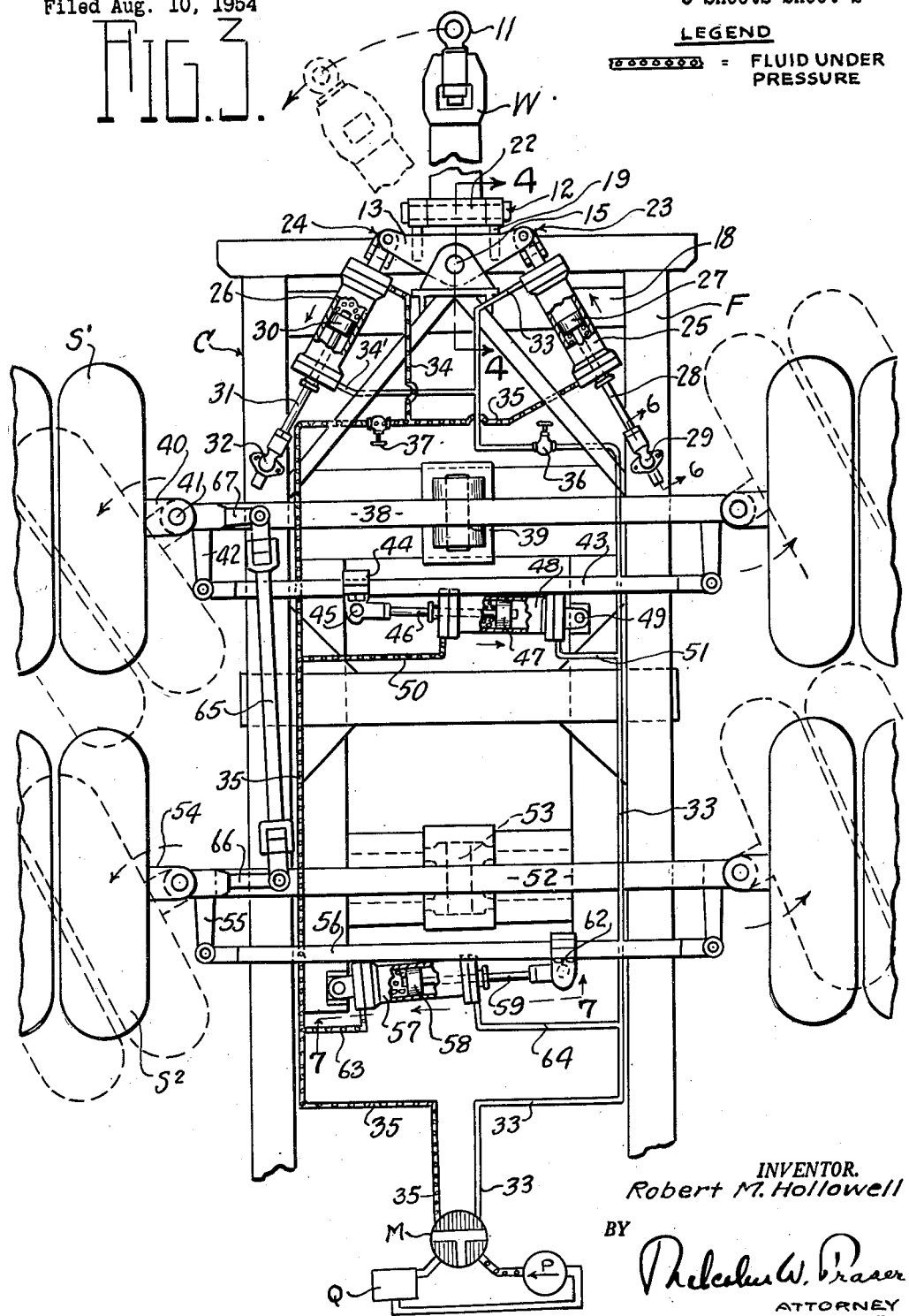

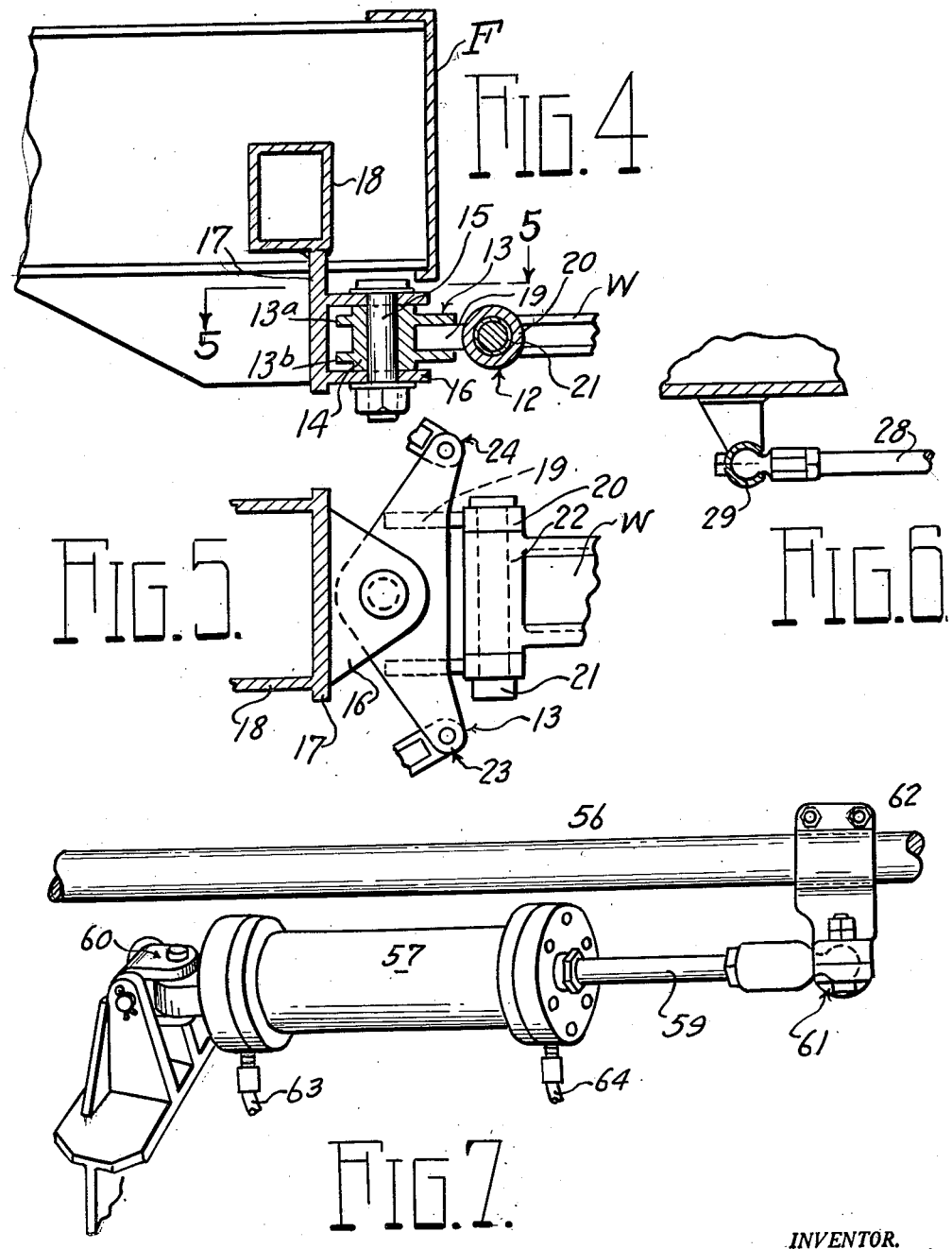

2,818,275

STEERING MECHANISM FOR CARRIERS

Robert M. Hollowell, Indianapolis, Ind., assignor to Insley Manufacturing Corporation, Indianapolis, Ind., a corporation of Indiana Application August 10, 1954, Serial No. 448,960

3 Claims. (Cl. 280—443)

This invention relates to steering devices for road vehicles but more particularly to steering devices for wheeled vehicles by which the wheels are conjoined and are concomitantly turned in one direction or the other.

An object is to produce a simple and efficient steering mechanism for trailers whereby certain of the road wheels thereof are automatically turned in accordance with the turning movement of the hauling or towing tractor.

Another object is to produce a hydraulic device for trailers for causing the road wheels thereof automatically to turn in one direction or the other in response to the turning movement of the hauling tractor.

A further object is to produce a wheeled vehicle having dirigible road wheels which can be readily turned for effecting steering by hydraulic means operating in a new and improved manner.

A still further object is to produce a wheel mounted carrier for cranes or the like having a hydraulic steering device which can be employed when the carrier is hauled by a tractor for automatically steering the carrier in accordance with the turning movement of the tractor or can operate, by effecting relatively simple adjustments, to steer the carrier when the latter is self-propelled, whereby much of the same hydraulic system for steering is employed when the carrier is a trailer or when it is a self-propelled unit.

An embodiment of the invention is shown by way of illustration but not of limitation, in the accompanying drawings in which:

Figure 1 is a diagrammatic side elevation partly fragmentary of a crane carrier, showing the same coupled to a hauling tractor;

Figure 2 shows a diagrammatic side elevation of the crane carrier showing the crane swung to a traveling position, the same being disconnected from the tractor;

Figure 3 is an enlarged fragmentary view of one end portion of the carrier showing the hydraulic steering mechanism and taken substantially on the line 3—3 of Figure 1;

Figure 4 is an enlarged vertical sectional view substantially on the line 4—4 of Figure 3;

Figure 5 is a transverse sectional view substantially on the line 5—5 of Figure 4;

Figure 6 is a fragmentary sectional view substantially on the line 6—6 of Figure 3; and Figure 7 is an enlarged transverse sectional view substantially on the line 7—7 of Figure 3.

The illustrated embodiment of the invention comprises an ambulatory carrier C which is formed with an elongate fabricated frame F constructed from longitudinal and transverse beams suitably braced and, if desired, welded together to form a sturdy frame or chassis. Supporting the front end of the frame F are sets of rubber-tired road wheels $S^1$ and $S^2$, each set consisting of dual wheels arranged in pairs on opposite sides of the frame. The rear end portion of the frame F is supported by sets of driving wheels D also rubber-tired and disposed at the rear, these wheels similarly being arranged in sets.

Mounted on the top of the frame F at the rear portion thereof is a turntable T, on which is supported the cab B containing suitable machinery for operating the hoisting boom $B^1$ in the usual manner and also having operative connection (not shown) with the wheels D for driving the same, thereby to enable the carrier to be self-propelled under appropriate circumstances. The machinery for operating the boom and for driving the wheels D is not shown since the same forms no part of this invention but will be readily understood by those skilled in this art.

At the front of the carrier directly beneath the frame F and projecting forwardly thereof is a pivoted tow bar W which may be detachably connected, the front end of which may be detachably connected to a bar S on a hauling tractor R. This arrangement enables the carrier to be towed from place to place when the carrier is not being propelled by the rear driving wheels D.

The rear end of the tow bar W is hingedly connected at 12 to a triangular plate unit or assembly 13 in or beneath the front end of the frame F. As shown, the triangular plate unit 13 comprises a pair of similarly shaped vertically spaced triangular plates 13a and 13b. The apex portions of these plates fit over a vertically disposed sleeve 14 to which the plates are welded and passing through the sleeve 14 and providing a pivotable mounting for the plate assembly 13 is a vertically disposed pivot post 15. The post 15 also projects through and is suitably secured to a pair of vertically spaced horizontally disposed bracket plates 16, the rear ends of which are rigid with an upright bracket plate 17 suitably secured as by welding to the underside of a transverse box beam 18 rigid with the frame F.

Welded to the plates 13a and 13b and disposed therebetween on opposite sides of the pivotable mounting thereof is a pair of parallel bars 19, the front ends of which project forwardly beyond the plates and are welded to bearing rings 20. Disposed between the bearing rings 20 is a transversely arranged sleeve 22 integral with the inner end of the draw bar W. A pivot pin 21 extends through the registering bores of the rings 20 and the sleeve 22 and is detachably mounted, thereby to enable the rear or inner end of the tow bar to be coupled to and uncoupled from the carrier C. The front end of the tow bar W has an eye 11 which can be conveniently hooked on or detached from a hook on the tractor bar S.

As particularly shown in Figure 3, it will be observed that the longer side of the plate assembly 13 is at the front of the carrier frame and adjacent the lateral end portions thereof are swivel connections, generally indicated at 23 and 24, and these swivel connections are to hydraulic cylinders 25 and 26 respectively. The cylinders 25 and 26 incline outwardly and rearwardly from their swivel connections. Reciprocable within the cylinder 25 is a piston 27 which has a piston rod 28 projecting outwardly and rearwardly from the cylinder and the free end thereof has a ball and socket connection 29 with the underside of the carrier frame F. Similarly in the cylinder 26 is a reciprocable piston 30, which has a piston rod 31 projecting rearwardly and outwardly therefrom, the rear end being connected by a ball and socket joint 32 with the underside of the carrier frame.

It will be understood that the cylinders 25 and 26 are suitably constructed to contain fluid and particularly liquid, and, as the triangular plate assembly 13 is rocked in one direction or the other through the swinging movement of the tow bar W, pressure is built up on one side or the other of the respective pistons. Thus movement of the tow bar W to the left (Figure 3) imparts rearward movement to the cylinder 26 and builds up pressure in front of the pistons 30 and at the same time the forward movement of the cylinder 25 builds up pressure in rear of the piston 27. Such fluid pressures are employed for steering the carrier as will hereinafter be described.

Extending from the forward end of the hydraulic cylinder 25 is a master or main tube 33, which extends rearwardly, the opposite end being connected to a control or steering valve M disposed within the crane cab B. From the front end of the hydraulic cylinder 26 extends a branch tube 34 which connects to a main tube 35 leading from the rear end of the hydraulic cylinder 25. A branch tube 34′ leads from the rear end of the hydraulic cylinder 26 to the tubing 33. In this manner it will be observed that the forward end of the cylinder 26 is connected to the rear end of the cylinder 25 whereas the front end of the cylinder 25 is connected to the rear end of the cylinder 26. The tube 35 extends rearwardly of the carrier frame and also connects to the steering valve M in the crane cab.

Connected to the steering valve M is a pump P power driven in any suitable manner for forcing liquid under pressure through the valve M to either the line of tubing 33 or 35. Communicating with the valve M as well as the pump P is a liquid reservoir Q. The valve M is a three way valve of any suitable type, and can be used either to connect the tubing 33 and 35 to enable liquid freely to flow from one tube to the other, or to enable the pump P to force liquid into either the tubing 33 or 35 according to the adjustment of the valve and at the same time allow liquid from the other tube to drain into the reservoir Q. As will hereinafter more fully appear, this arrangement enables the steering to be accomplished from the crane cab B.

In the tube 33 is a hand-operated valve 36, which can be manipulated to open or close that tube. Also in the tube 35 is a hand-operated valve 37 for controlling the flow of liquid therethrough, the valve 37 being disposed on the side of the branch tube 34 toward the valve M.

As shown in Figure 3, it will be observed that there are dual wheels $S^1$ on each side of the carrier frame C. For mounting the wheels $S^1$ on each side of the frame C, there is a transverse axle 38, which is mounted for rocking movement on a pivot 39 arranged parallel to the longitudinal axis of the carrier frame. At each end of the axle 38 are axle assemblies for the adjacent pairs of wheels, the same including axle elements 40, which are mounted for rocking movement about a vertical axis on king pins 41. Rigid with the axle elements 40 are rearwardly extending arms 42 so connected that by rocking movement of the arm 42 in a horizontal plane corresponding movement may be imparted to the adjacent wheels $S^1$. The structure on the two sides of the carrier frame is the same and the above description shall suffice for both sides. A cross-link 43 pivotally connected to the rear ends of the arms 42 enables conjoint rocking or tuning movement of the road wheels, as will be readily understood.

Clamped to the cross-link 43 is a bracket 44, which has a ball and socket connection 45 with a piston rod 46 extending into a hydraulic cylinder 48, there being a piston 47 reciprocable within the cylinder and connected to the outer end of the rod 46. The cylinder 48 has a suitable universal connection 49 to the underside of the carrier frame. From the rear end of the hydraulic cylinder 48 extends a branch tube 50 which connects to the main tube 35, the opposite end of the cylinder 48 being connected by a branch tube 51 to the main tube 33.

The rear sets of wheels $S^2$ are mounted similarly to the wheels $S^1$. In this instance there is an axle 52 similarly mounted for rocking movements on a pivot 53. Associated with each pair of wheels $S^2$ on either side of the carrier frame are axle assemblies including an axle element 54, which is similarly mounted for rocking movement about a vertical axis and fixed to the axle member 54 and extending rearwardly is an actuating arm 55, the two actuating arms on opposite sides of the carrier frame being pivotally connected to each other by a cross-link 56. A hydraulic cylinder 57 adjacent the cross-link 56 is connected thereto similar to the connection between the hydraulic cylinder 48 and the cross-link 43. Reciprocable within the hydraulic cylinder 57 is a piston 58, which has a piston-rod 59 extending outside of the cylinder and connected by a ball and socket joint to a bracket fixed to the connecting link 56, the ball and socket joint being indicated at 61 on Figure 7 and the bracket at 62. The cylinder 57 is shown provided with a suitable universal connection 60 to the underside of the carrier frame. Extending from one end of the cylinder 57 is a branch tube 63, which connects to the main tube 35 and extending from the opposite end of the cylinder 57 is a branch tube 64, which connects to the main tube 33.

To insure concomitant movement of the sets of wheels $S^1$ and $S^2$ a drag link 65 has universal connection with arms 66 and 67 rigid with and projecting inwardly from the respective axle elements 54 and 40. In this manner the sets of wheels $S^1$ and $S^2$ are required to move similarly to each other on both sides of the carrier frame.

In operation it will be understood that when the carrier C is hauled by the tractor R with the tow bar W connected as indicated on Figure 1, the valve M in the crane cab B is adjusted to such position that the main tubes 35 and 33 are disconnected from each other to prevent flow of liquid from one to the other. Also at this time the hand valves 36 and 37 are opened to allow liquid to flow freely through the tubes. Assuming that the tow bar W is moved to the left of Figure 3, as indicated by the broken lines, this causes counter-clockwise movement of the triangular plate assembly 13 and imposes hydraulic pressure between the piston 30 and the front end of the cylinder 26 as indicated by the legend on the figure, thereby creating hydraulic pressure in the branch tube 34 and the main tube 35. Simultaneously hydraulic pressure is created between the piston 27 in the cylinder 25 and the rear end of that cylinder, building up hydraulic pressure in the main tube 35. Since the tube 35 is connected by the branch tube 50 with the rear end or piston rod end of the cylinder 48, the hydraulic pressure exerted against the piston 47 forces the tie-link 43 to the right of Figure 3 thereby to turn or rock the sets of wheels $S^1$ on both sides of the carrier frame toward the position shown by the broken lines.

Simultaneous with the above operation, pressure is built up in the branch tube 63 which leads from the main tube 35 and the pressure within the cylinder 57 is such as to force the piston outwardly and cause the tie-rod 56 to move to the right of the figure, thus rocking both sets of wheels $S^2$ in a similar direction to the wheels $S^1$. Manifestly the valve M in the crane cab B is closed during the above operation.

It will also be understood that both the lines 33 and 35 together with their branches as well as the respective cylinders are filled with suitable liquid and as a consequence upon the movement of the tow-bar above described, the liquid on the opposite sides of pistons 30, 27 and 58 are forced through their branch lines into the main tube 33 and thence into the front end of the cylinder 25, and the rear end of the cylinder 26. Manifestly upon movement of the tow bar W to the right of Figure 3, the above operation will be reversed. Thus when the carrier C is being towed by the tractor R, hydraulic steering of the sets of the rubber-tired wheels $S^1$ and $S^2$ is automatically effected in response to the swinging movement in one direction or the other of the tow bar W.

When the carrier C travels under its own power by operation of the machinery within the frame cab B, the valves 36 and 37 are closed thereby rendering inoperative the hydraulic cylinders 25 and 26. Thus with the valves 36 and 37 closed and the steering valve M in neutral position, no relative motion is imparted to the pistons in the cylinders 48 and 57. Manifestly before the valves 36 and 37 are closed the wheels $S^1$ and $S^2$ must be disposed parallel with the longitudinal center of the carrier frame.

When the carrier C is operating under its own power, the valve M is turned or adjusted to one position or another to cause liquid to be forced by the pump P into the line 33 or 35 depending upon the direction of the turning movement desired. The liquid forced from the cylinders 48 and 57 is delivered through one of the main tubes 33 and 35 into the suitable reservoir Q with which the pump P communicates, thereby to maintain a closed hydraulic system and to compensate for any loss of liquid which might take place.

When the carrier C is operated under its own power then the tow bar W is removed as indicated in Figure 2. As shown in this position the crane boom is swung around over the carrier to effect the desired traveling position.

Numerous changes may be effected in detailed construction, arrangement and operation without departing from the spirit of the invention, especially as defined in the appended claims.

What I claim is:

1. Steering mechanism for carriers, comprising a frame, dirigible road wheels for said frame, an oscillatable member operating on a central vertical axis at the front of the frame, tow means connected to said member whereby the member and tow means swing together in response to the turning movement of the hauling tractor, a driving hydraulic linear motor for each end of said oscillatable member and connected respectively to the member and the frame, a link connection between wheels on opposite sides of the frame to cause same to turn together, a hydraulic linear driven motor connecting said link connection and the frame, a main tube extending from the front end of one of said driving motors to the rear end of said driven motor, a branch tube from the rear end of the other of said driving motors and connected to said main tube, a second main tube extending from the front end of the other of said driving motors to the front end of said driven motor, and a branch tube from said second main tube to the rear end of said first driving motor.

2. Steering mechanism for carriers, comprising a frame, dirigible road wheels for said frame, an oscillatable member operating a central vertical axis at the front of the frame, tow means connected to said member whereby the member and tow means swing together in response to the turning movement of the hauling tractor, a driving hydraulic linear motor for each end of said oscillatable member and connected respectively to the member and the frame, a link connection between wheels on opposite sides of the frame to cause same to turn together, a driven hydraulic linear motor connecting said link connection and the frame, a main tube extending from the front end of one of said driving motors to the rear end of said driven motor, a branch tube from the rear end of the other of said driving motors and connected to said main tube, a second main tube extending from the front end of the other of said driving motors to the front end of said driven motor, a branch tube from said second main tube to the rear end of said first driving motor, a manual valve in each main tube between the driving motors and said driven motor thereby to render when closed said driving motors inoperative, a steering valve, connections between opposite ends of said main tubes and said steering valve, and hydraulic pressure means associated with said steering valve whereby liquid under pressure may be directed to one or the other of the main tubes to cause said driven motor to effect turning of the wheels in one direction or the other.

3. Steering mechanism for carriers comprising a frame, dirigible road wheel for said frame, an oscillatable member operating on a vertical axis at the front of the frame, tow means for said oscillatable member whereby the member swings about said vertical axis in response to turning movement of a hauling tractor, double-acting hydraulic motor means having first and second parts, said motor means being actuated in one direction or the other in response to pressure fluid input to one or the other of its parts, means operatively connecting said motor means to said frame and to said wheels for steering the latter in one direction or the other in response to input of pressure fluid to one or the other of said motor means ports, a first pump means supported by said frame, a control valve, a fluid conduit system including connections between said first pump means, valve and motor means for selectively actuating the latter in one direction or the other, a second pump means operatively connected to said frame and said oscillatable member, said second pump means being of the double-acting type and having first and second ports from which fluid is emitted respectively in response to swinging of said member in one direction and the other, said fluid conduit system including connections between the first and second ports of the second pump means and the motor means whereby the latter is appropriately actuated in one direction or the other in response to corresponding swinging motion of said member, and valve means in said fluid conduit system for disabling the fluid connections between said double-acting pump means and motor means, whereby the wheels may be selectively steered either by the turning motion of the hauling tractor or the control valve and whereby the double-acting pump means may be disabled when steering is effected by the control valve.

References Cited in the file of this patent

UNITED STATES PATENTS

| | | |
|---|---|---|
| 2,111,668 | Latzen | Mar. 22, 1938 |
| 2,152,511 | Vanderwerf | Mar. 28, 1939 |
| 2,383,216 | Runyan | Aug. 21, 1945 |
| 2,510,525 | Smart | June 6, 1950 |
| 2,761,693 | Stover | Sept. 4, 1956 |

FOREIGN PATENTS

| | | |
|---|---|---|
| 122,956 | Australia | Nov. 29, 1946 |
| 644,455 | Great Britain | Oct. 11, 1950 |
| 307,950 | Italy | May 19, 1933 |